United States Patent
Kawakami et al.

(10) Patent No.: US 7,460,339 B2
(45) Date of Patent: Dec. 2, 2008

(54) INERTIAL LATCH THAT RESTRICTS ACTUATOR ROTATION IN A FIRST DIRECTION BUT NOT IN A SECOND DIRECTION

(75) Inventors: Takanori Kawakami, Kanagawa (JP); Shinichi Kimura, Kanagawa (JP); Satoshi Matsumura, Kawasaki (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 313 days.

(21) Appl. No.: 10/892,944

(22) Filed: Jul. 16, 2004

(65) Prior Publication Data

US 2005/0063091 A1   Mar. 24, 2005

(30) Foreign Application Priority Data

Sep. 18, 2003   (JP)   ............... 2003-326777

(51) Int. Cl.
    *G11B 5/54*   (2006.01)
    *G11B 21/22*   (2006.01)
(52) U.S. Cl. .................................... 360/256.4
(58) Field of Classification Search ...... 360/256–256.4, 360/256.5, 256.6; 720/673
    See application file for complete search history.

(56) References Cited

U.S. PATENT DOCUMENTS

| | | | |
|---|---|---|---|
| 6,163,440 A * | 12/2000 | Takahashi et al. | 360/256.4 |
| 6,185,074 B1 * | 2/2001 | Wang et al. | 360/256.4 |
| 6,327,119 B1 * | 12/2001 | Barina et al. | 360/256.4 |
| 6,400,533 B1 * | 6/2002 | Liu et al. | 360/256.5 |
| 6,487,052 B1 * | 11/2002 | Macpherson et al. | 360/256.2 |
| 6,498,703 B2 * | 12/2002 | Misso et al. | 360/256.4 |
| 6,507,461 B1 * | 1/2003 | Kimura et al. | 360/256.4 |
| 6,535,359 B1 * | 3/2003 | Boutaghou | 360/256.4 |
| 6,680,822 B1 * | 1/2004 | Lin et al. | 360/256.4 |
| 6,710,980 B1 * | 3/2004 | Hauert et al. | 360/256.4 |
| 6,757,139 B2 * | 6/2004 | Miyamoto | 360/256.4 |
| 2002/0044387 A1 * | 4/2002 | Miyamoto | 360/256.4 |
| 2002/0054456 A1 * | 5/2002 | Misso et al. | 360/256.4 |
| 2003/0035246 A1 * | 2/2003 | Byun et al. | 360/256.4 |
| 2003/0086210 A1 * | 5/2003 | Miyajima | 360/256.4 |
| 2003/0147179 A1 * | 8/2003 | Hashizume et al. | 360/256.4 |
| 2003/0189795 A1 * | 10/2003 | Chang et al. | 360/256.2 |
| 2003/0210500 A1 * | 11/2003 | Hong et al. | 360/256.1 |
| 2004/0141256 A1 * | 7/2004 | Hong et al. | 360/256 |
| 2005/0057857 A1 * | 3/2005 | Kawakami et al. | 360/256.4 |

* cited by examiner

*Primary Examiner*—Brian E. Miller
*Assistant Examiner*—Matthew G Kayrish
(74) *Attorney, Agent, or Firm*—Townsend and Townsend and Crew LLP; John Henkhaus

(57) ABSTRACT

A rotating disk storage device has a mechanism for latching an actuator head suspension assembly (AHSA) positively in a retraction area upon occurrence of an external shock or runaway. In one embodiment, a latch mechanism comprises an AHSA which is supported pivotably, an elastic member which restricts a pivotal movement of the AHSA in a pivot direction A1 of the AHSA, an inertia member adapted to move pivotally in a corresponding pivot direction B2 when the AHSA moves pivotally in the pivot direction A1 while deforming the elastic member elastically, and a latch member having an engaging portion and adapted to move pivotally in a direction A2 opposite from the corresponding pivot direction B2 upon receipt of torque from the inertia member, thereby causing the engaging portion to move to a latching position. The AHSA has two to-be-engaged portions, i.e., a first to-be-engaged portion and a second to-be-engaged portion. Even in the event the engaging portion cannot engage the first to-be-engaged portion, it can engage the second to-be-engaged portion.

20 Claims, 11 Drawing Sheets

FIG.2
(A)
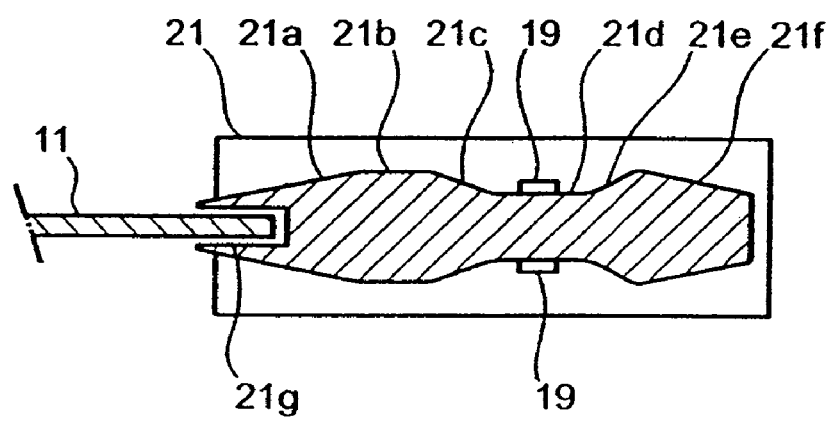
(B)
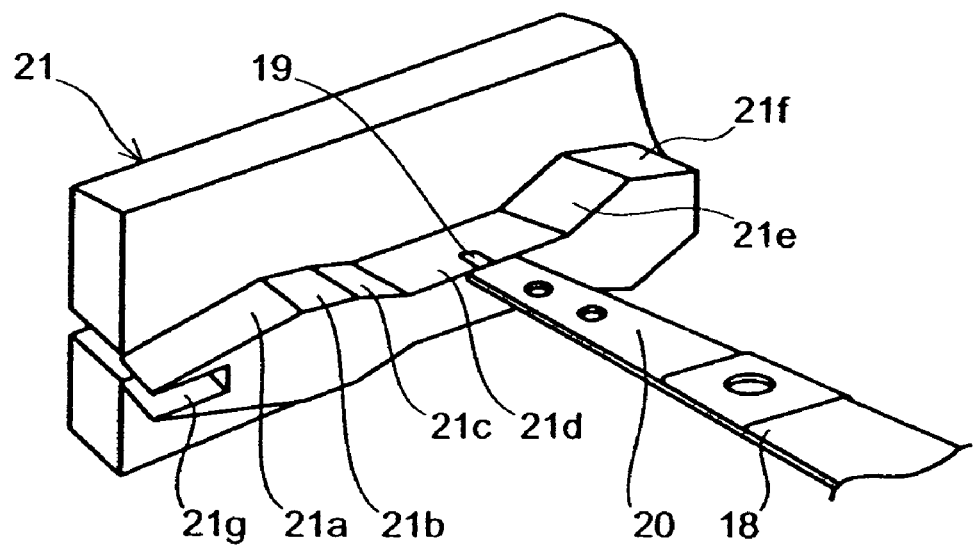

INERTIAL LATCH THAT RESTRICTS ACTUATOR ROTATION IN A FIRST DIRECTION BUT NOT IN A SECOND DIRECTION

BACKGROUND OF THE INVENTION

The present invention relates to a rotating disk storage device such as a magnetic disk drive or a magneto-optic disk device, and more particularly to an inertial latch mechanism for preventing an actuator head suspension assembly from jumping out onto a recording medium due to shock or runaway in a rotating disk storage device.

In a magnetic disk drive, a head/slider supported by an actuator assembly moves pivotally in an approximately radial direction of a rotating magnetic disk while flying over a recording surface of the magnetic disk through a slight spacing from the recording surface to read and write data. A load beam which supports the head/slider produces a pressure in a direction in which the head/slider is pushed against the recording surface of the magnetic disk, and an air bearing surface of the slider is balanced with buoyancy which the air bearing surface undergoes from a current of air created on the surface of the magnetic disk, whereby a predetermined gap is ensured between the air bearing surface and the recording surface.

While the magnetic disk rotates at a predetermined number of revolutions, the slider and the recording surface of the magnetic disk scarcely contact each other under the action of an air current created on the disk surface. However, if the head/slider lands on the recording surface of the magnetic disk whose rotation has stopped, the head/slider is attracted to the recording surface of the magnetic disk due to, for example, a lubricant applied to the recording surface, inter-attraction between smooth surfaces of the recording surface and the air bearing surface, and pressure of the load beam. If the magnetic disk is rotated in the attracted state of the head/slider, a phenomenon called sticktion will occur, which may flaw the surface of the slider or the magnetic disk or may result in start-up being impossible. If the number of revolutions of the magnetic disk lowers to a level below a predetermined value, the buoyancy between the slider and the recording surface decreases and both come into contact with each other, with consequent likelihood of damage. Therefore, it is also necessary to prevent such a decrease in the number of revolutions of the magnetic disk.

Thus, in the load/unload type magnetic disk drive, at the time of stopping the rotation of the magnetic disk, the head/slider is retracted to a retracting position called a ramp which is provided outside the recording surface of the magnetic disk; then the magnetic disk is started up and the head/slider is held in the ramp until the rotation of the magnetic disk becomes a normal rotation. In the load/unload type magnetic disk drive there is provided an outer crash stop formed of an elastic material such as rubber to define a limit position of a pivotal range when the actuator assembly moves pivotally toward the retracting position.

In a normal retracting motion of the actuator assembly, the actuator assembly is moved pivotally at a controlled speed from the recording surface to the retracting position until light collision with the outer crash stop to turn OFF a voice coil motor (VCM). The outer crash stop attenuates a shock energy of the actuator assembly, causing the actuator assembly to stop at the retracting position which lies above the ramp. When the magnetic disk is next rotated and the head/slider is moved to the recording surface, it is necessary that the actuator assembly be held at such a degree of strength as permits it to turn quickly with the driving force of VCM.

On the other hand, while the magnetic disk drive is carried alone or in a mounted state onto a portable device, it may undergo a shock comprising various parameters such as strength, angle, position, and rotation from the exterior. Such a shock from the exterior may cause the head/slider to move to the recording surface of the magnetic disk which is at a standstill, giving rise to sticktion. Further, in the event of sudden power failure while the magnetic disk drive operates and the head/slider is making access to the recording surface of the magnetic disk, the head/slider may land on the recording surface of the magnetic disk when at a standstill if this condition is allowed to stand and there also may occur sticktion.

In this case, in order to prevent the occurrence of sticktion, the actuator assembly is moved to the retracting position by utilizing a counter-electromotive force of a spindle motor which rotates the magnetic disk or by utilizing an electric charge stored in an electronic circuit. In this connection there is adopted a circuit configuration such that the speed of the actuator assembly is higher than the normal retracting speed by a fair amount so as to permit positive retraction with limited energy. After collision of the actuator assembly with the crash stopper, the actuator assembly may rebound and the head/slider may return to the recording surface of the magnetic disk whose number of revolutions is in a lowered state below a predetermined value.

Further, since a control circuit is constructed so that even when control of the actuator assembly becomes impossible during operation, this state is detected and the head/slider is moved at high speed up to the retracting position, there may occur a phenomenon similar to the above. For example, in WO 00/74056, there is described a technique for holding the actuator assembly in the retracting position so as not to rebound and move to the operation range even in the event of violent collision thereof with the stopper.

In FIG. 8 of WO 00/74056 there are shown a lever 15 which is supported pivotably about a pivot shaft 18 and a latch 16 having an engaging concave 15b and an engaging side portion 15c both capable of engaging with operating pins 16a and 16b of the lever 15, the latch 16 being supported pivotably about a pivot shaft 19. When an actuator arm 6 undergoes a strong shock and moves pivotally in C1 direction and tends to move pivotally in B1 direction as a reaction of collision with an outer crash stop 17, a sensor projection 16e formed in the latch 16 is pushed by the actuator arm and causes the latch 16 to move pivotally in B3 direction, thereby preventing the latch from jumping out from its home position.

A rotating disk storage device having a rotating disk storage medium undergoes a shock defined by various parameters from the exterior while it is in operation and not in operation. Against such a shock it is necessary to prevent the head/slider from landing on the recording surface of the recording medium which is at a standstill or is rotating at a speed below a predetermined number of revolutions. This is also true of the case where the control of an actuator head suspension assembly (hereinafter referred to simply as "AHSA") becomes unstable or the case where there occurs runaway thereof or where the supply of electric power stops suddenly during operation.

To restrict the pivoting range of AHSA mechanically, the storage device is provided with an outer crash stop and an inner crash stop on both sides of the pivoting range, both outer and inner crash stops being formed of an elastic material. In a load/unload type storage device using a ramp, an AHSA is brought into collision with the outer crash stop when retracted to attenuate collision energy and is stopped at a position close to the outer crash stop, allowing a head/slider to be retracted to the ramp. However, it is impossible for the outer crash stop to fully attenuate the collision energy of the AHSA which collides with the outer crash stop at a high speed. Moreover, the selection of an elastic material and temperature management are difficult. Thus, it is not easy to control the attenuating action. In particular in an ultra-small sized rotating disk storage device such as a one-inch type, the space for provision of an elastic member is restricted and there occurs a great temperature change. Therefore, it is not easy to let the elastic effect of such an elastic member as rubber be exhibited appropriately.

Further, in the method disclosed in WO 00/74056, there is a fear that a latching shock may exert a bad influence on AHSA as the latching frequency for AHSA increases. The AHSA is constructed of precision parts for obtaining a satisfactory follow-up characteristic of the head/slider, so there is a fear that the characteristic may be deteriorated as the latching shock increases. Therefore, in a latch mechanism for latching AHSA after collision with the outer crash stop and rebounding, it is desirable to minimize the latching frequency and fully attenuate AHSA energy when latching. For this reason it is desired to provide a mechanism to let AHSA be retracted to the retracting position without giving a shock thereto against external shock, runaway during operation, or power failure.

An inertial latch mechanism is constructed such that an engaging portion of a latch member arrives at a latching position before an AHSA pivots in a second direction and a to-be-engaged portion thereof passes the latching position due to runaway and the resulting rebounding from an elastic member or due to a shock during retraction. However, in a shock or runaway state, various conditions act in a composite manner and an inertia member-latch member linking operation is extremely fine, so there may occur a case where the to-be-engaged portion passes the latching position before arrival of the engaging portion at the latching position, making it impossible to effect latching. In the normal unloading or retracting operation, the AHSA stops at its home position, but when it is retracted at the home position, it cannot be locked firmly. This is needed to allow for the next pivoting with the torque of VCM and making access to the storage medium.

If the AHSA is locked firmly, it is necessary to unlock the AHSA just before operation thereof, thus requiring the provision of a complicated structure. According to the operational principle of the inertial latch mechanism, in the event of external shock or runaway of the AHSA, the head/slider lying above the retraction area moves from its home position toward the storage medium and is latched at this position by cooperation of both inertia member and latch member.

It is not desirable to set the retraction area very large for latching the head/slider above the retraction area, because in a contact start stop type ("CSS" type hereinunder) device the area of a recording surface of a recording medium becomes narrow and in a load/unload type device the ramp size becomes large or the pivoting range of AHSA becomes too large.

BRIEF SUMMARY OF THE INVENTION

Embodiments of the present invention provide a rotating disk storage device having an inertial latch mechanism capable of latching a head/slider of the AHSA positively in a retraction area so as not to jump out onto a recording medium when the AHSA rebounds upon collision at a high speed with an elastic member due to runaway or interruption of power supply or upon exertion of an external shock on the AHSA when retracted in the retraction area.

Further embodiments of the present invention provide a rotating disk storage device having an inertial latch mechanism capable of quickly attenuating shock energy imposed on the AHSA when the AHSA collides with an elastic member at a high speed due to an external shock, runaway during operation, or interruption of power supply, also capable of decreasing the frequency of the AHSA rebounding from the elastic member and being latched by the latch mechanism, capable of diminishing a shock developed at the time of latching the rebounding AHSA, and further capable of latching the AHSA positively in the retraction area.

A feature of the present invention resides in that, in an inertial latch mechanism for latching an AHSA in a rotating disk storage device so as not to jump out from a retraction area onto a recording surface of a magnetic disk which is rotating at a number of revolutions below a predetermined value or is at a standstill, there are provided plural engaging or to-be-engaged portions for latching to ensure the latching operation in the retraction area.

In a first aspect of the present invention there is provided a rotating disk storage device comprising a rotating disk storage medium; an actuator head suspension assembly with a head/slider mounted thereon and having a plurality of to-be-engaged portions, the actuator head suspension assembly being pivotable in both first and second direction; a member for restricting a pivoting range of the actuator head suspension assembly in the first direction; an inertia member adapted to operate upon exertion of a shock on the rotating disk storage device; and a latch member having an engaging portion for latching any of the plural to-be-engaged portions in a retraction area to restrict a pivotal movement of the actuator head suspension assembly in the second direction, the latch member being adapted to operate upon receipt of force from the inertia member and causing the engaging portion to move up to a latching position.

The AHSA has plural to-be-engaged portions, and the engaging portion can latch any of the to-be-engaged portions in the retraction area. In a load/unload type device, the retraction area is provided on a ramp which is mounted outside the recording medium; while in a CSS type device, the retraction area is provided in part of the area of the recording medium.

Providing plural to-be-engaged portions in a coil support is convenient for obtaining a peripheral space for the arrangement of the latch mechanism. Likewise, providing plural to-be-engaged portions in adjacency to a pivotal outer periphery portion of the AHSA is convenient for adopting a construction wherein, when to-be-engaged portions arrive successively at the latching position and an engaging portion later arrives at the latching position, even if the engaging portion fails in latching the first to-be-engaged portion, it is possible to latch the next to-be-engaged portion.

The load/unload device is constructed such that, no matter which to-be-engaged portion may be latched, a margin lip stops on any of a plurality of ramp faces. This construction can be attained by appropriately selecting the position of each to-be-engaged portion, the ramp size, and the pivotal angle of the latch member.

In a second aspect of the present invention there is provided a rotating disk storage device comprising a rotating disk storage medium; an actuator head suspension assembly with a head/slider mounted thereon and having a plurality of to-be-engaged portions, the actuator suspension assembly being pivotable in both first and second directions; a member for restricting a pivoting range of the actuator head suspension assembly in the first direction; an inertia member adapted to move upon receipt of force from the actuator head suspension assembly; and a latch member having an engaging portion for latching any of the plural to-be-engaged portions in a retraction area to restrict a pivotal movement of the actuator head suspension assembly in the second direction, the latch member being adapted to move upon receipt of force from the moving inertia member and causing the engaging portion to move up to a latching position.

Embodiments of the present invention provide a rotating disk storage device having an inertial latch mechanism capable of latching a head/slider of an AHSA positively in a retraction area so as not to jump out onto a recording medium upon collision of the AHSA at a high speed with an elastic member and rebounding due to runaway or interruption of power supply or upon exertion of an external shock on the AHSA during retraction thereof in the retraction area.

Further embodiments of the present invention provide a rotating disk storage device having an inertial latch mechanism capable of quickly attenuating shock energy imposed on an AHSA upon collision of the AHSA at a high speed with an elastic member due to an external shock, runaway during operation, or interruption of power supply, also capable of attenuating the frequency of the AHSA rebounding from the elastic member and being latched by a latch mechanism, capable of diminishing a shock developed at the time of latching the rebounding AHSA, and further capable of latching the AHSA positively in the retraction area.

BRIEF DESCRIPTION OF THE DRAWINGS

FIG. 2 comprises a side view and a perspective view of a ramp.

DETAILED DESCRIPTION OF THE INVENTION

Figure 1:
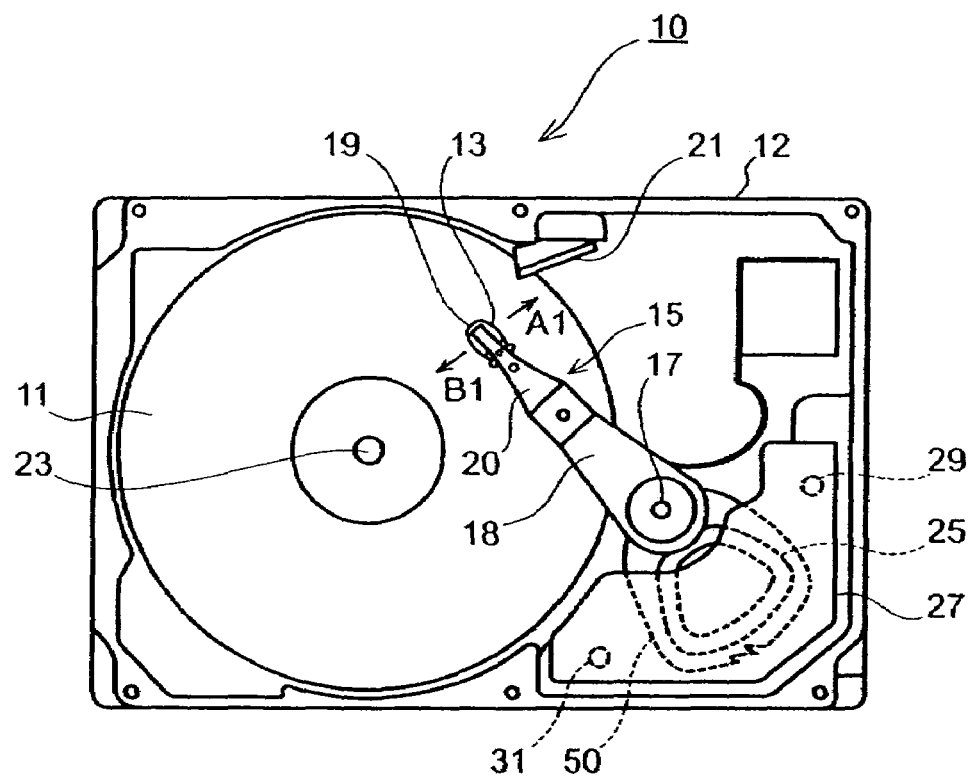
FIG. 1 is a schematic plan view of a magnetic disk drive 10 according to an embodiment of the present invention.

FIG. 1 is a schematic plan view of a magnetic disk drive 10 illustrating an embodiment of the present invention. In all of the drawings attached hereto, the same components are identified by the same reference numerals. The exterior of the magnetic disk drive 10 is covered with a casing body 12 and a casing cover (not shown) attached to the casing body. The casing body 12 is mainly composed of a base which provides a mounting surface to components and side walls to which the casing cover is attached.

A magnetic disk 11 has a recording surface with a magnetic layer formed on a surface thereof. The magnetic disk 11 is secured to a hub which is rotated by a spindle motor, and is adapted to rotate around a spindle shaft 23. In a CSS type storage device which adopts a contact start stop (CSS) method, the magnetic disk 11 has not only the recording surface but also a non-recording area which provides a retraction area for a slider. The magnetic disk 11 may be provided as a single disk or as a stack of plural disks, but in this embodiment there is adopted a single magnetic disk.

An AHSA 15 includes a head suspension assembly (HSA) 20, an actuator arm 18, a coil support 50, and a voice coil 25 which is held by the coil support. The AHSA 15 is attached to the base through a pivot cartridge so as to be pivotable about a pivot shaft 17. Mounting portions of the actuator arm, the coil support and the pivot cartridge are formed integrally by die-casting aluminum or a synthetic resin as a non-magnetic material. But there may be adopted a so-called lamination type suspension structure wherein the HSA itself is attached directly to the pivot cartridge.

In order that servo control is difficult to be influenced by external vibration or shock during operation, the AHSA 15 is constructed with its center of gravity lying above the pivot shaft. The HSA 20 is constructed to include a load beam attached to the actuator arm 18 and a flexure attached to the load beam. At a front end portion of the load beam is provided a margin lip 19 or a tab. A head/slider 13 is attached to the flexure.

The head/slider 13 comprises a head which reads and/or write data for the magnetic disk 11 and a slider which receives buoyancy from a current of air on the surface of the magnetic disk rotating with head mounted thereon and which thereby floats over the recording surface through a slight gap. The slider is attached to the flexure in such a manner that an air bearing surface is opposed to the recording surface of the magnetic disk 11. The load beam generates a pressure in a direction to push the head/slider 13 against the recording surface of the magnetic disk 11. A lubricant for the prevention of damage is applied to the recording surface of the magnetic disk because the head/slider 13 may contact the recording surface during operation.

Near a rear end portion of the AHSA 15 there is disposed a voice coil yoke 27 so as to cover the voice coil 25, the voice coil yoke 27 being supported by the base of the casing body 12. Together with the voice coil 25, the voice coil yoke 27 forms a VCM, and when the voice coil 25 is disposed within a magnetic field formed by both yoke and magnet and an electric current is allowed to flow in the coil, it is possible to let the AHSA 15 move pivotally in direction A1 or B1. An outer crash stop 31 and an inner crash stop 29 each formed to contain an elastic body such as rubber are secured to the underside of the voice coil yoke 27 so as to be erected on the base of the casing.

The outer crash stop 31 limits a direction in which the head/slider 13 of the AHSA 15 moves to the outside of the magnetic disk, while the inner crash stop 29 limits a direction in which the head/slider 13 moves toward the spindle shaft 23. A magnet is embedded in the outer crash stop 31 so as to lightly chuck the coil support 50 which comes into abutment against the outer crash stop 31. In constituting the outer crash stop, a rigid rod may be erected on the base and an elastic body may be provided at the abutting portion of the coil support, or a part of the coil support may be allowed to fulfill an elastic function, as indicated by reference numerals 46 and 47 in FIG. 6 of Japanese Unexamined Patent Publication No. 2000-243044.

A ramp 21 is mounted near the outside of the magnetic disk 11. FIG. 2 comprises a side view and a perspective view of the ramp 21, in which (A) shows margin lips 19 of two AHSAs and (B) shows a part of one AHSA for the simplification of explanation. A slit 21g is formed in the ramp 21 and an outer periphery portion of the magnetic disk 11 is fitted in the slit 21g rotatably. The ramp 21 provides an area to which the head/slider is retracted before the rotating speed of the magnetic disk 11 decreases below a predetermined number of revolutions. The ramp 21 has slant faces 21a, flat faces 21b, slant faces 21c, flat faces 21d, and slant faces 21e, 21f successively from the side close to the magnetic disk 11. The slant faces 21e and 21f are provided for inserting the margin lips 19 from a rear portion of the ramp after the ramp 21 is mounted to the casing 12 to mount the AHSAs 15 to the base.

With respect to each AHSA 15, if in FIG. 1 the AHSA 15 is moved pivotally in the direction of A1 from the recording surface of the magnetic disk 11, the margin lip 19 comes into contact with the slant face 21a and the head/slider 13 is lifted slightly from its floating position. As the AHSA 15 further moves pivotally, the head/slider 13 reaches the flat face 21b while moving gradually in a direction away from the recording surface of the magnetic disk. The load beam of HSA 20 is constructed so as to provide pressure in a direction to push the head/slider 13 against the recording surface. While the margin lip 19 slides on the slant face 21a and reaches the flat face 21b, the pressure of the HSA 20 becomes stronger gradually, so that a frictional force acting to prevent the pivotal movement of the AHSA 15 in A1 direction increases.

The driving force of the VCM overcomes the frictional force and can move the AHSA 15 to a further extent in A1 direction. The VCM is controlled in such a manner that, as the margin lip 19 further moves pivotally in A1 direction after reaching the flat face 21d via the slant face 21c, the coil support 50 collides with the outer crash stop 31 and the margin lip 19 stops on the flat face 21d. The outer crash stop 31 is deformed elastically and attenuates the collision energy of the AHSA 15. In an unloading operation in a controlled state, the magnet embedded in the outer crash stop 31 attracts the coil support 50 and causes the AHSA 15 to stop in that position. Without the magnet, the AHSA 15 will somewhat move pivotally in B1 direction under a light reaction after collision and will stop on the flat face 21d due to friction between the margin lip 19 and the flat face 21d.

The position, at which the AHSA 15 collides with the outer crash stop and stops by unloading in a normal operating condition except such abnormal conditions as runaway and power failure, is called the home position of the AHSA. In the home position, the margin lip 19 is in engagement with the flat face 21d of the ramp. The home position of the AHSA is sure to lie on the flat face 21d of the ramp, but not all margin lip positions on the flat face 21d are home positions of the AHSA.

In FIG. 2(A), the flat face 21d of the ramp 21 is spaced in the vertical direction from the recording surface of the magnetic disk 11, so when the margin lip 19 is engaged with the flat face 21d and the head/slider 13 is in its retracted state, the margin lip 19 is pushed against the flat face 21d by the load beam, generating a frictional force to prevent the pivoting motion of the AHSA 15. In cooperation with the action of the slant face 21c, the frictional force acts to prevent the AHSA placed on the flat face 21d from moving toward the recording surface of the magnetic disk.

Therefore, with the frictional force of the flat face 21d and the attractive force of the magnet embedded in the outer crash stop 31, even if a weak shock is given from the exterior to the AHSA 15 placed in the home position, the AHSA 15 can stay in the home position or stay in the range of the flat face 21d or the slant face 21c. However, the frictional force of the flat face 21d and that of the slant face 21c, as well as the attractive force of the magnet, cannot be set too strong because it is necessary for the driving force of the VCM to overcome them when the magnetic disk 11 is rotated to move the AHSA 15 pivotally in B1 direction.

The magnetic disk drive 10 is constructed so as to move the AHSA 15 at a high speed in A1 direction until collision of the AHSA with the outer crash stop 31 in order to let the head/slider 13 retract to the ramp 21 before turning OFF of the spindle motor in the event of sudden interruption of power supply or when it has become impossible to exert control. Therefore, when a strong shock is given from the exterior to the magnetic disk drive or when the power supply of the magnetic disk drive is cut off suddenly or upon runaway of the same device, it is likely that the coil support 50 will strike vigorously against the outer crash stop 31 and the resulting reaction will cause the head/slider to move pivotally in B1 direction and land on the recording surface of the magnetic disk 11 which is at a standstill.

Figure 3:
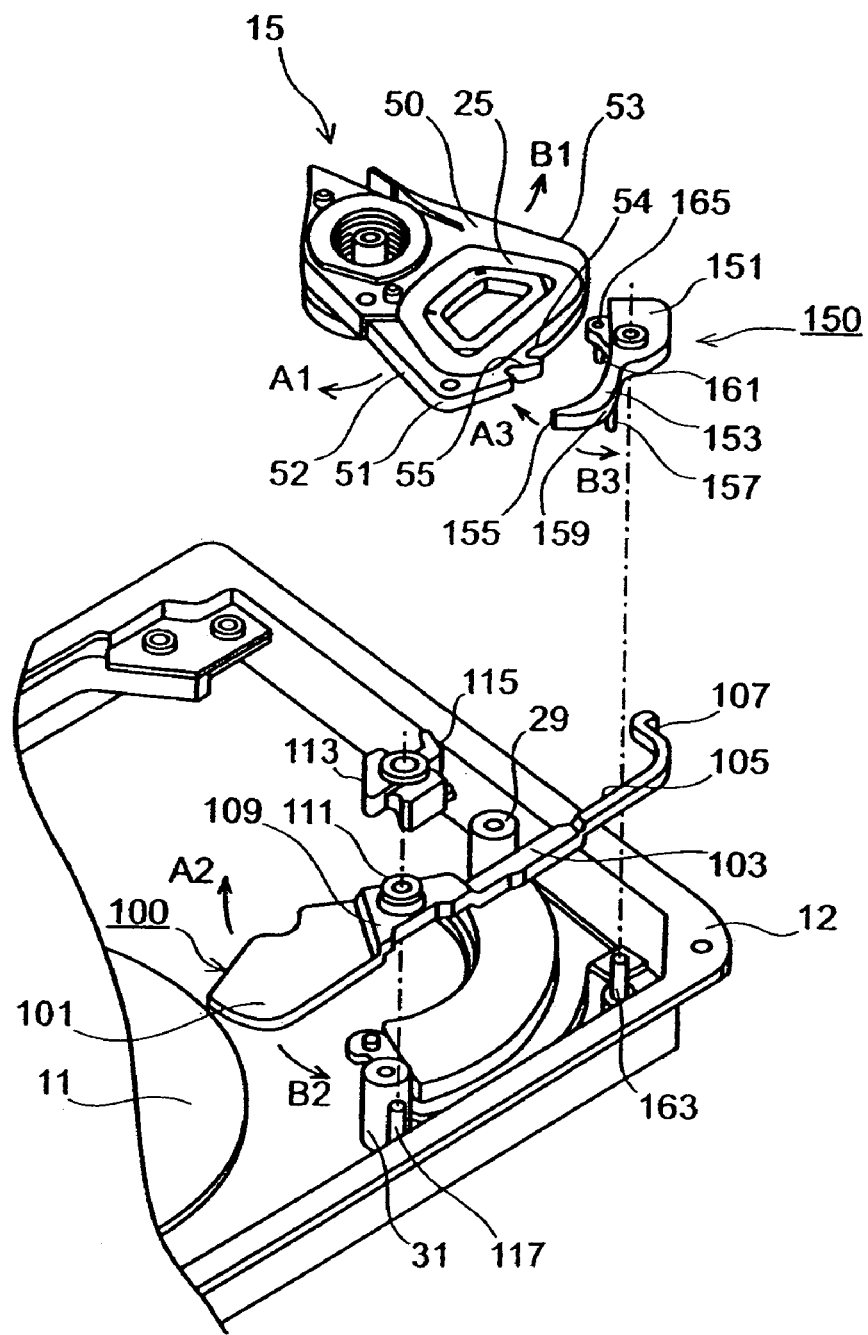
FIG. 3 is an exploded perspective view of a latch mechanism used in the embodiment.
Figure 4:
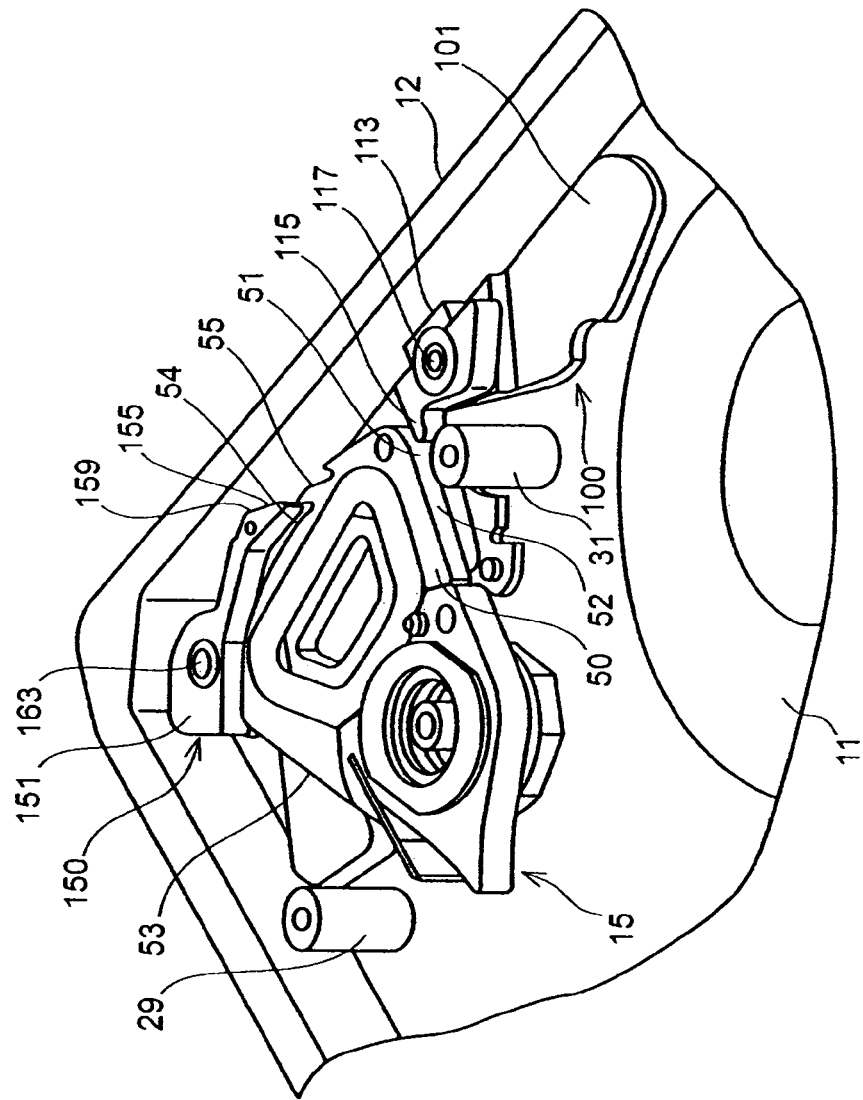
FIG. 4 is an assembly diagram thereof.

FIG. 3 is an exploded perspective view of a latch mechanism used in this embodiment and FIG. 4 is an assembly diagram of the latch mechanism. The latch mechanism is mainly composed of an inertia member 100, a latch member 150, the outer crash stop 31, and the coil support 50. The coil support 50 as a part of the AHSA 15 which is illustrated at only its rear portion surrounds the entire periphery of the voice coil 25. Two arms extend backward from near the area in which a pivot cartridge of the coil support 50 is inserted, one arm being provided with a first abutting portion 51 for imparting torque to the inertia member and a second abutting portion 52 for abutment against the outer crash stop 31, and the other arm being provided with a third abutting portion 53 for abutment against the inner crash stop 29.

A magnetic metallic piece (not shown) for being attracted by the magnet embedded in the outer crash stop 31 is attached to the second abutting portion 52. The two arms are bent and connected together at a rear end of the AHSA 15. In the connecting portions of the arms there are formed a first to-be-engaged portion 54 and a second to-be-engaged portion 55 both of a cut-away shape so as to open at an angle in the pivoting direction of B1.

The inertia member 100 is provided with a long arm portion 103 and a wide balancer portion 101 on both sides of a hole into which a pivot shaft 117 is inserted. The inertia member 100 is supported pivotably about the pivot shaft 117 which is erected on the base. Since the inertia member 100 functions to absorb both shock energy and kinetic energy of the AHSA, it is formed of a relatively heavy material such as metal so as to afford a relatively large moment of inertia. As for the material, there is selected a non-magnetic material so as not to be influenced by a magnetic field from a voice coil yoke. The inertia member is formed so that the center of gravity based on the arm portion 103 and the balancer portion 101 lies on the pivot shaft 117.

Thus, if there occurs such a shock as suddenly stops movement in a direction in which the magnetic disk drive 10 rotates about the pivot shaft 117, the inertia member 100 moves pivotally, but fails to turn even if there occurs such a shock as is based on movement in a direction in which the magnetic disk drive 10 does not rotate about the pivot shaft 117. On side faces of the arm portion 103 there are provided a first abutting portion 105 at a position which faces the coil support 50 and a second abutting portion 107 at a position which faces the side opposite to the coil support 50, the first and second abutting portions being each abutted against a latch member.

A mounting surface 109 is formed around the pivot shaft of the inertia member 100. A hole formed centrally of an auxiliary member 113 is fitted on a boss 111, whereby the auxiliary member 113 is fixed to the mounting surface 109 and both auxiliary member 113 and the inertia member 100 pivotally move integrally about the pivot shaft 117. The auxiliary member 113 is provided with an abutting portion 115 for abutment against the first abutting portion 51 of the coil support 50. The auxiliary member 113 is for transmitting collision energy resulting from collision of the coil support 50 with the outer crash stop 31 to the inertia member 100. The auxiliary member 113 may be substituted by a structure wherein the inertia member 100 abuts the coil support directly.

Against a pivotal movement of the AHSA 15 in A1 direction, the auxiliary member 113 causes the inertia member 100 to function as a stopper instead of the outer crash stop 31. That is, in the case where the outer crash stop 31 is not provided, the AHSA 15 which pivots in A1 direction collides with the abutting portion 115 of the auxiliary member 113, imparting a torque to the inertia member 100 and causing it to turn in B2 direction. The inertia member 100 absorbs shock energy of the AHSA 15 as kinetic energy and moves pivotally in B2 direction while exhibiting a shock absorbing function, eventually comes into abutment against a side wall of the casing 12 to stop the pivotal movement of the AHSA 15 in A1 direction.

A latch member 150 is provided with an arm portion 153 and a balancer portion 151 on both sides of a hole through which a pivot shaft 163 passes, and is supported pivotally about the pivot shaft 163 which is erected on the base. The latch member 150 is constructed so that the moment of inertia thereof is about several percent of that of the inertia member 100. For example, the latch member 150 is formed using a relatively light material such as a plastic material. As the material there is selected a non-magnetic material so as not to be influenced by a magnetic field from the voice coil yoke.

The latch member 150 is formed so that the center of gravity based on both arm portion 153 and balancer portion 151 lies on the pivot shaft 163. Therefore, the latch member moves pivotally with a shock acting in a direction in which the magnetic disk drive 10 rotates about the pivot shaft 163, but does not pivot with a shock acting in a direction in which the magnetic disk drive 10 does not rotate about the pivot shaft 163. At a front end of the arm portion 153 there is formed a wedge-like engaging portion 155 capable of engaging the first or the second to-be-engaged portion of the coil support. Further, a first abutting pin 157 capable of coming into abutment against the first abutting portion 105 of the inertia member projects from the underside of the arm portion 153, while a second abutting pin 161 capable of coming into abutment against the second abutting portion 107 of the inertia member projects from the underside of the balancer portion 151.

Further, an abutting portion 159 for abutment against a wall portion of the casing body 12 is formed on a side face of the arm portion 153. A magnet 165 is embedded in the balancer portion 151. The magnet 165 is constructed so as to create a biasing force for attracting a magnetic iron piece (not shown) provided in part of the coil support 50 when the coil support has approached the magnet and for moving the latch member pivotally in B3 direction. The biasing force may be developed using a spring centered on the pivot shaft 163, the spring being abutted at one end thereof against a side wall of the casing and engaged at an opposite end thereof with the arm portion 153. Further, there are illustrated an outer crash stop 31 and an inner crash stop 29 both erected on the base which is formed in a cylindrical shape.

In FIG. 4 there is illustrated a state in which the coil support 50, the inertia member 100, and the latch member 150 are installed in the base. The second abutting portion 52 and the third abutting portion 54 can be abutted against the outer crash stop 31 and the inner crash stop 29, respectively, of the coil support 50. Next, the operation of the latch mechanism constructed as above will be described below with reference to FIGS. 5 to 7.

Operation of the Latch Mechanism Upon Runaway of AHSA

Figure 5:
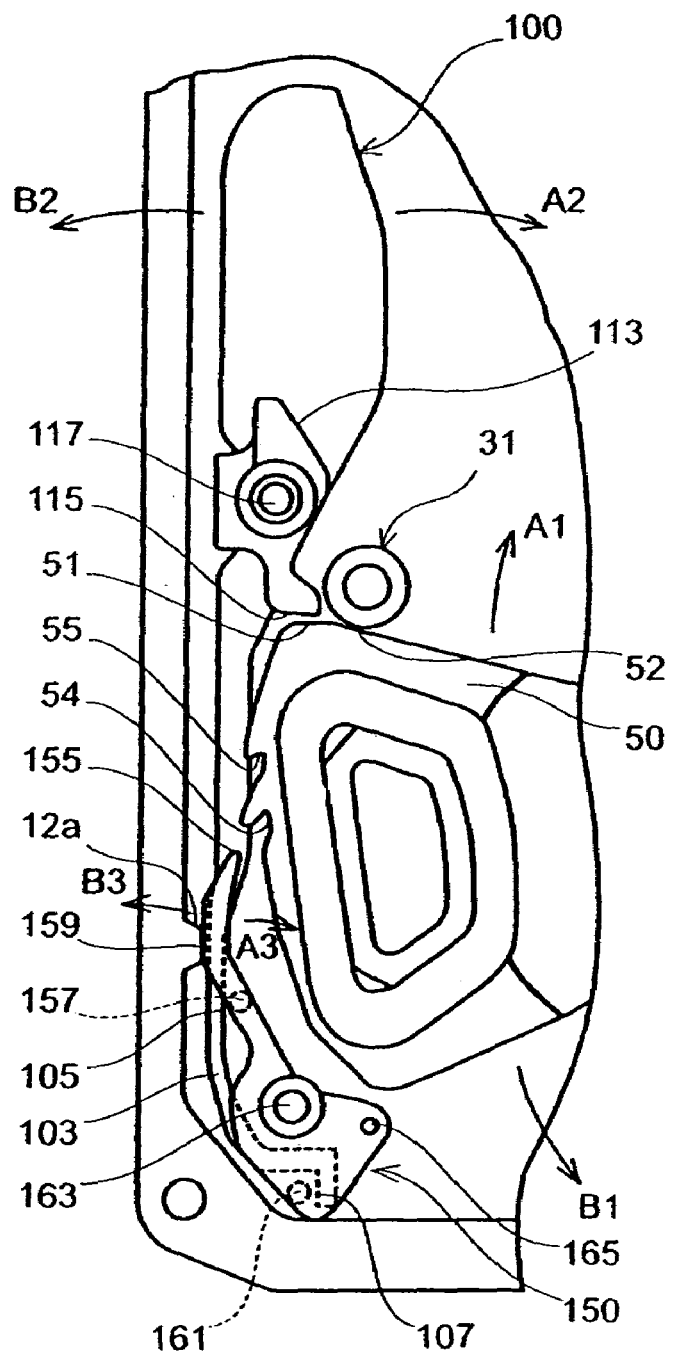
FIG. 5 illustrates a state of an instant in which an AHSA collides with an outer crash stop.

FIG. 5 shows a state in an instant in which the AHSA 15 collides with the outer crash stop 31 after runaway pivotally in A1 direction at a higher speed than the normal speed. In the latch member 150, the magnet 165 attracts the magnetic metallic piece of the coil support 50 and moves pivotally in B3 direction and the abutting portion 159 is at a standstill in abutment against a side wall 12a of the casing. A slight gap is present between the first abutting pin 157 and the first abutting portion 105 and/or between the second abutting pin 161 and the second abutting portion 107.

When the latch member moves pivotally in B3 direction, the first abutting pin 157 comes into abutment against the first abutting portion 105 of the inertia member and acts to move the inertia member 100 in A2 direction. As the inertia member 100 moves pivotally in A2 direction, the second abutting portion 107 of the inertia member approaches the second abutting pin 161 of the latch member. Therefore, when the abutting portion 159 of the latch member comes into abutment against the side wall 12a of the casing before abutment of the second abutting pin 161 against the second abutting portion 107, the inertia member 100 is in a freely pivotable state by a distance corresponding to the gap between the second abutting pin 161 and the second abutting portion 107. This state corresponds to a home position with respect to the inertia member 100 and the latch member 150. In one aspect of the present embodiment there is included a construction wherein, in the home position, the first abutting pin 157 and the first abutting portion 105 come into contact with each other and the second abutting pint 161 and the second abutting portion 107 also come into contact with each other and wherein, upon pivotal movement of the inertia member 100 in B2 direction from the home position, the latch member 150 receives torque from the inertia member and moves pivotally in A3 direction.

In case of pivotal movement as in the ordinary unloading mode, the outer crash stop 31 comes into abutment against the second abutting portion 52 of the coil support 50 and the AHSA 15 deflects slightly, the resulting collision energy is consumed for compression of the elastic body. Moreover, a repulsive force which the AHSA 15 receives from the elastic body is weak. Consequently, the margin lip 19 stops at the home position which lies on the flat face 21c of the ramp 21. At this time, since only the AHSA 15 operates, the inertia member 100 and the latch member 150 do not pivot from the home position.

In the event the AHSA 15 collides with the outer crash stop 31 at a high speed upon runaway or sudden power failure, the outer crash stop 31 is the first to deflect and absorbs and attenuates the shock energy. Further, as the AHSA 15 continues to move pivotally in A1 direction while applying an elastic deformation to the outer crash stop, the first abutting portion 51 of the coil support 50 comes into abutment against the abutting portion 115 of the auxiliary member 113 and causes the inertia member 100 to move pivotally in B2 direction.

If in the home position there is a gap between the first abutting portion 105 of the inertia member 100 and the first abutting pin 159 of the latch member 150, first only the inertia member 100 moves pivotally in B2 direction, and upon subsequent abutment of the first abutting portion 105 against the first abutting pin 157, the latch member 150 is given a torque from the inertia member and moves pivotally in A3 direction.

In this state, collision energy resulting from collision of the AHSA 15 against the outer crash stop 31 is consumed by energy for deforming rubber elastically, a frictional force which the margin lip 19 receives from the flat face 21c, energy for rotating the inertia member 100 having a relatively large moment of inertia, and energy for rotating the latch member 150 having a relatively small moment of inertia. Thus, there can be obtained a large attenuation quantity in comparison with the case where the shock is absorbed by only the outer crash stop. In other words, the stopper mechanism used in this embodiment has a shock absorbing ability higher by an amount corresponding to energy for moving the inertia member pivotally.

If the AHSA 15 consumes all of the pivoting energy in A1 direction at this time point, it then moves pivotally in B1 direction under the repulsive force of the outer crash stop 31, but the amount of the pivotal movement is small. The abutting portion 52 of the coil support 50 is attracted by the magnet embedded in the outer crash stop, whereby the AHSA 15 can stop at the home position. Thereafter, the latch member 150 moves pivotally in B3 direction under the attractive action between the magnet 165 and the coil support 50 and returns to the home position, allowing the AHSA 15 to freely move pivotally.

Thus, the rotational energy of the inertia member 100 or the rotational energy of both inertia member 100 and latch member 150 is added to the compressive energy of the outer crash stop, so that the attenuation quantity of collision energy of the AHSA 15 increases and the AHSA 15 can be stopped at the home position without latching operation even under a stronger shock than the conventional level of shock. Although the latching operation can bring the AHSA 15 into positive stop at the home position, a large shock acts on the AHSA 15, so it is preferable to let the AHSA be retracted to the home position without latching.

In the case where the pivoting speed of the AHSA 15 which moves pivotally in A1 direction is high and rotational energy thereof is large, the AHSA 15 further moves pivotally in A1 direction. Upon receipt of the torque from the AHSA 15, the inertia member 150 moves pivotally in B2 direction and imparts the torque to the latch member 150, causing the latch member to move pivotally in A3 direction until the engaging portion 155 of the latch member 150 reaches a latching position. The latching position indicates a position with respect to the inertia member, latch member and the AHSA at which the engaging portion 155 of the latch member can engage the first to-be-engaged portion 54 or the second to-be-engaged portion 55 formed in the coil support 50.

Figure 6:
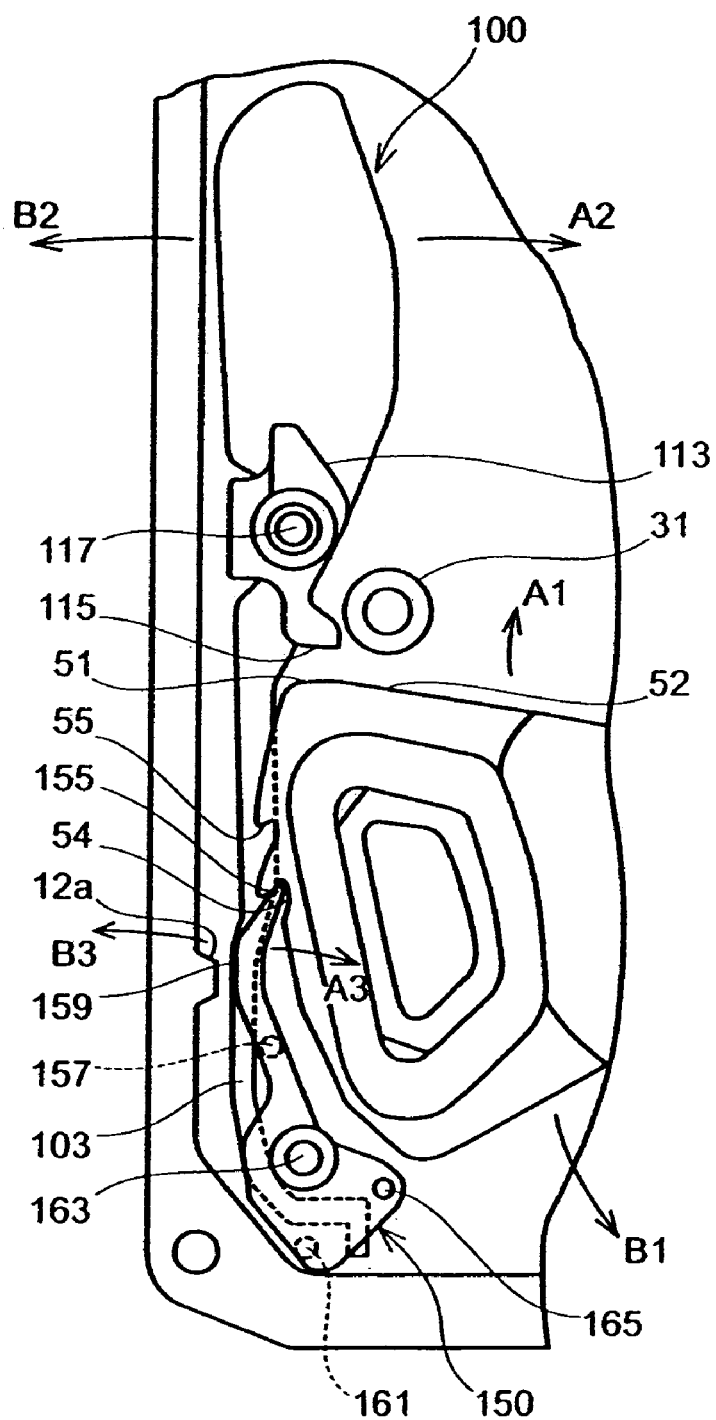
FIG. 6 illustrates a latched state of a coil support by the AHSA.

If the collision energy of the AHSA 15 cannot be absorbed by compressive absorption of the outer crash stop 31, rotational energy absorption of the inertia member 100 and latch member 150, and frictional force absorption of the margin lip 19 and the flat face 21c, the AHSA 15 rebounds and moves pivotally in B1 direction by a reaction induced when the compression of the elastic body reaches a limit. However, in the latch mechanism used in this embodiment, when the AHSA 15 rebounds and collides with the outer crash stop 31 with such a strength as causes the head/slider 13 to move to the recording surface of the magnetic disk 11, the inertia member 100 receives torque and moves pivotally in B2 direction through the abutting portion 115 of the auxiliary member 113 according to the magnitude of the resulting deflection. Further, the first abutting pin 157 receives torque from the first abutting portion 105 of the inertia member 100 and the latch member 150 moves pivotally in A3 direction, and since the engaging portion 155 has already reached the latching position, the rebounded coil support 50 is latched at its first to-be-engaged portion 54 by the engaging portion 155 of the latch member and does not pivot in B1 direction beyond the latching position. This state is shown in FIG. 6.

The angle at which the inertia member 100 causes the latch member to move pivotally from the home position up to the latching position is set small relative to the angle at which the AHSA 15 rebounds and moves pivotally up to the latching position. Therefore, even assuming that the AHSA 15, inertia member 100, and latch member 150 pivot at an equal angular velocity, the latch member 150 reaches the latching position before the AHSA 15 rebounds and reaches the latching position, so that it is possible to latch the first to-be-engaged portion 54 of the coil support positively.

However, an external shock involves various parameters, which act in a composite manner. Further, the latch member and the inertia member may be linked and the operation thereof is extremely delicate. There is a case where the engaging portion 155 of the latch member arrives at the latching position after the first to-be-engaged portion 54 has passed the latching position, making it impossible to latch the first to-be-engaged portion. In this embodiment, the first and the second to-be-engaged portion are provided adjacent to each other in the coil support which constitutes a pivotal outer periphery portion of the AHSA, and in the event the timing of the engaging portion 155 of the latch member 150 arriving at the latching position is delayed and cannot latch the first to-be-engaged portion 54, it is possible to latch the second to-be-engaged portion 55 which arrives at the latching position later than the first to-be-engaged portion 54.

When the first to-be-engaged portion 54 is latched, the margin lip 19 stops on the flat face 21b and near the boundary between the flat face 21b and the slant face 21c in the ramp 21 shown in FIG. 2. When the second to-be-engaged portion 55 is latched, the margin lip 19 stops on the slant face 21a at a position close to the magnetic disk 11 in the ramp 21 shown in FIG. 2. At the position of the margin lip 19 at which the second to-be-engaged portion 55 is latched, the head/slider 13 lies on the recording surface of the magnetic disk 11. If the magnetic disk 11 rotates in this state, the head/slider 13 oscillates under the influence of an air current and may contact the surface of the magnetic disk.

Thus, the construction in which the second to-be-engaged portion 55 is always latched is not desirable, but the second to-be-engaged portion 55 is effective in preventing the occurrence of a worst case of the head/slider 13 jumping out completely onto the magnetic disk. Therefore, the construction in which a to-be-engaged portion is provided in only the position of the second to-be-engaged portion 55 arriving fully late at the latching position, without forming the first to-be-engaged portion 54, is not desirable because the head/slider retracts always on the slant face 21a of the ramp 21. It is preferable to provide two to-be-engaged portion as in this embodiment.

No limitation is made to this embodiment, but the position in which the second to-be-engaged portion is latched may be made the position at which the margin lip 19 stops on the flat face 21b, and the position in which the first to-be-engaged portion is latched made the position at which the margin lip 19 stops on the slant face 21c or on the flat face 21d. In this embodiment, moreover, although in the pivoting direction of AHSA 15 there are formed two to-be-engaged portions 54 and 55 in the coil support, the concept of the present invention includes the provision of three or more to-be-engaged portions.

There also is a case where the coil support 50 latched by the engaging portion 155 of the latch member 150 again moves pivotally in A1 direction by the resulting reaction, but since the kinetic energy of the AHSA 15 is in an attenuated state, even if the AHSA 15 again collides with the outer crash stop 31, there does not remain such a degree of energy as permits the head/slider 13 to jump out to the recording surface. Consequently, the AHSA 15 stops at or near the home position by virtue of energy absorption through an elastic deformation of the outer crash stop, absorption as rotational energy of the inertia member and the latch member, attractive force of the magnet embedded in the outer crash stop, and the frictional force created between the margin lip 19 and the flat face 21c.

If the residual energy is not fully attenuated at the time of re-collision of the AHSA 15 with the outer crash stop 31, the coil support 50 is latched again by a cooperative action of the link mechanism comprising the inertia member 100 and the latch member 150 even upon rebounding of the coil support 50. In this embodiment, the elasticity of the elastic body in the outer crash stop 31 is set at an appropriate value such that, when the AHSA 15 retracts in the normal unloading operation, it is possible to absorb a shock without a pivotal moment of the inertia member 100, and the inertia member is allowed to pivot when the shock becomes large to a certain extent.

Figure 7:
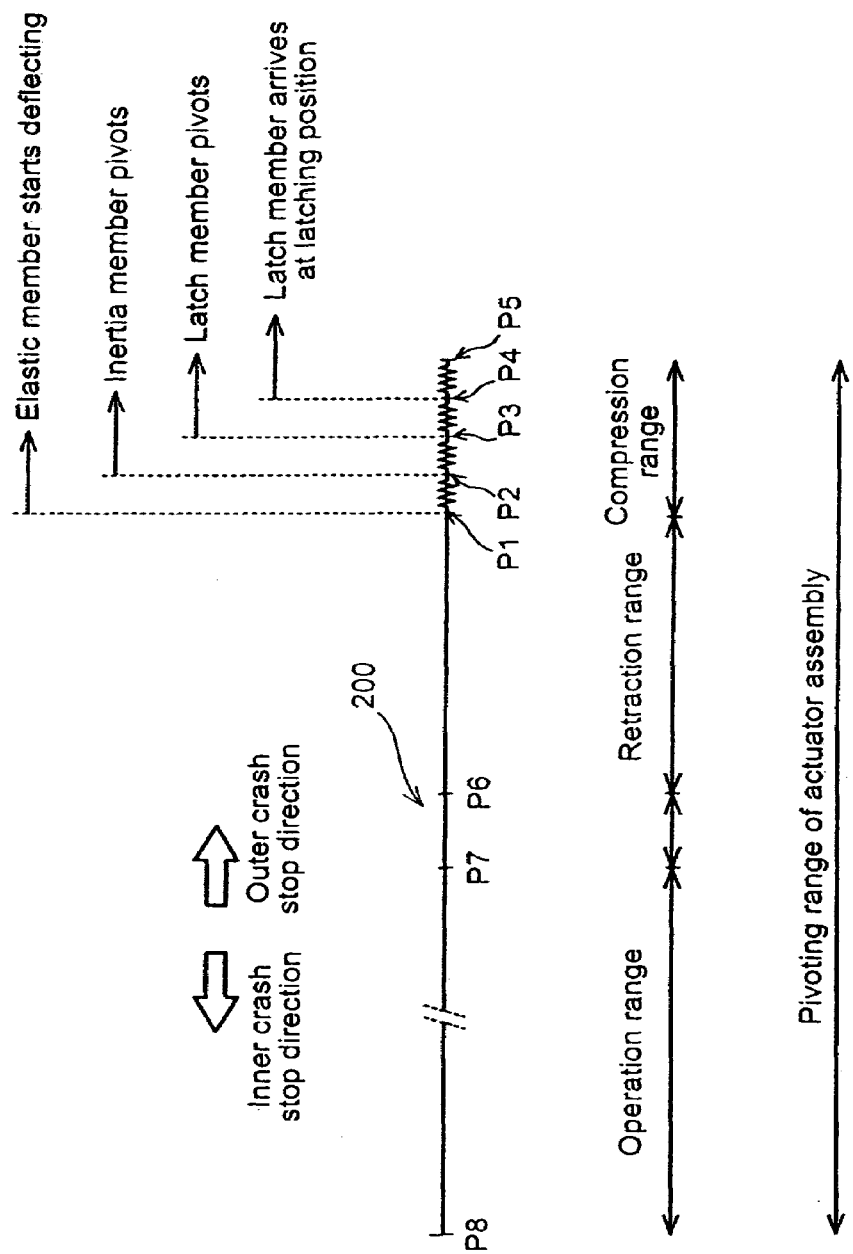
FIG. 7 illustrates a relation between a pivotal position of the AHSA and the operation of the latch mechanism.

Relation Between the Pivotal Position of AHSA and the Operation of the Latch Mechanism Next, with reference to FIG. 7, a description will now be given of the relation between the pivotal movement of the AHSA 15, the stopper mechanism and the operation of the latch mechanism. A line 200 represents a pivoting range of the AHSA 15. The AHSA 15 pivots in a range delimited by both inner crash stop 29 and outer crash stop 31. For the head/slider, the inner crash stop 29 defines a track position close to the innermost periphery of the magnetic disk 11, serving as a start point of writing servo information. Therefore, the inner crash stop 29 is formed using a relatively hard elastic material. The pivoting limit position of the AHSA defined by the inner crash stop 29 is assumed to be position P8. The range from position P8 to position P7 is designated an operation range in which the head/slider floats over the recording surface.

The position P7 is a boundary position in which the floating head/slider moves to the slant face 21a of the ramp 21. The range between positions P7 and P6 is a range in which the margin lip 19 lies above the slant face 21a or 21b. The range between positions P6 and P1 is a retraction range in which the margin lip 19 lies above the flat face 21c of the ramp, which range is designated a retraction range. Position P1 is a position in an instant of contact of the second abutting portion 52 of the coil support 50 with the outer crash stop 31, in which position the rubber is not deflected yet. Position P2 is a position in which the inertia member 100 lying in the home position receives a torque from the coil support 50 and starts moving pivotally in B2 direction.

Position P3 is a position in which the latch member 150 lying in the home position receives a torque from the pivoted inertia member 100 and starts pivoting in A3 direction. Position P4 is a position in which the engaging portion 155 of the latch member 150 reaches the latching position. Position P5 is a limit position in which the elasticity of the elastic body in the outer crash stop increases and limits the pivotal movement of the AHSA in A1 direction. Although in this embodiment the positions P1, P2, and P3 are set as different positions, there may be adopted as another embodiment a construction wherein P1, P2, and P3 are the same position and both inertia member and latch member move pivotally upon deflection of the elastic member. There also may be adopted as a further embodiment a construction wherein P2 and P3 are the same position and both inertia member and latch member are pivotally moved simultaneously after the elastic member has been deflected by a predetermined certain quantity. Such a construction permits adjusting the relation between the first abutting pin 157 and the first abutting portion 105, the relation between the second abutting pin 161 and the second abutting portion 107, and the relation between the abutting portion 157 and the side wall 12a.

The range between positions P1 and P5 is a range in which the coil support moves pivotally in A1 direction while applying an elastic deformation to the rubber of the outer crash stop 31, or moves pivotally in B1 direction while receiving a repulsive force from the rubber. This range is designated a compression range. Thus, the pivoting range of the AHSA includes the operation range, the retraction range, and the compression range. In FIG. 7, the compression range between P1 and P5 is described on a larger scale to make the drawing easier to understand and therefore the reduced scale does not coincide with the actual range.

Operation of the Latch Mechanism when AHSA Pivots in A1 Direction by Shock

Next, the following description is provided about the operation of the latch mechanism in this embodiment when the AHSA 15 moves pivotally in A1 direction upon exertion of a shock on the magnetic disk drive 10 from the exterior. In this case, the operation of the latch mechanism is different from that in runaway described above. Torque induced by the shock is applied to both inertia member 100 and latch member 150, acting to move them pivotally from the home position. The shock applied to the magnetic disk drive involves various parameters such as strength, direction, rotation or non-rotation, and the center of rotation; and thus the behaviors of the AHSA 15, inertia member 100, and latch member 150 are complicated upon exertion thereon of an external shock. However, the AHSA 15 is constructed so that its center of gravity lies on the pivot shaft 17, so when it moves pivotally, it is presumed that a shock has given to the magnetic disk drive 10 in a direction of rotation centered on the pivot shaft 17 or a vicinity thereof.

Such a shock can be simulated in a state in which the magnetic disk drive 10 is supported and moved pivotally in A1 direction by a tester so as to be rotatable about the pivot shaft 17 of the AHSA 15 and is brought into collision with a fixed object to stop its rotation suddenly. The components accommodated in the magnetic disk drive 10 except those held movably stop their movement in A1 direction suddenly upon collision, but the AHSA 15, inertia member 100, and latch member 150 continue their movement by inertia.

Since the pivot shaft 117 of the inertia member 100 and the pivot shaft 163 of the latch member 150 are positioned in proximity to the pivot shaft 17, it is presumed that an approximately equal angular acceleration is applied to the AHSA 15, inertia member 100, and latch member 150 as a result of a shock. With a shock, the inertia member 100 moves pivotally in A2 direction and the latch member 150 moves pivotally in A3 direction. When the latch member 150 pivots in A3 direction, the first and second abutting pins 157, 161 of the latch member do not come into abutment against the first and second abutting portions 105, 161 of the inertia member 100, so that the engaging portion 155 moves to the latching position without being influenced by the inertia member 100.

If the time of contact of the second abutting portion 52 of the coil support 50 with the outer crash stop 31 is long, the magnet 165 of the latch member 150 attracts the metallic piece of the coil support 50, pivots in B3 direction, and returns to the home position. If the collision speed of AHSA is low and shock energy is weak, the AHSA 15 stops at or near the home position by virtue of energy absorption by elastic deformation of the outer crash stop 31, rotational energy absorption of both inertia member 100 and latch member 150, attraction of the second abutting portion 52 by the magnet embedded in the outer crash stop 31, and a frictional force induced between the margin lip 19 and the flat face 21*d*. At this time, the position of the margin lip 19 on the ramp 21 lies on the flat face 21*d* shown in FIG. 2 and near the boundary between the flat face 21*d* and the slant face 21*e*.

If the speed of collision of the AHSA 15 with the outer crash stop 31 is very high and rebounds and moves pivotally in B1 direction, the first engaging portion 54 or the second engaging portion 55 of the AHSA 15 is latched by the first engaging portion 155 because the time taken for the AHSA 15 to rebound and reach the latching position is higher than the time taken for the latch member to leave the latching position. At this time, the position of the margin lip 19 on the ramp 21 lies on the flat face 21*d* shown in FIG. 2 and near the boundary between the flat face 21*d* and the slant face 21*e*.

In this embodiment, when the AHSA 15 collides with the outer crash stop 31, the abutting portion 115 of the auxiliary member 113 receives a torque from the first abutting portion 51 of the coil support 50 and the inertia member 100 moves pivotally in B2 direction, further, the latch member 150 receives a torque from the inertia member and moves pivotally in A3 direction. Therefore, even if the AHSA 15 rebounds largely at the outer crash stop 31, it can be latched positively in the first to-be-engaged portion 54 of the coil support 50.

Operation of the Latch Mechanism when AHSA Pivots in B1 Direction by Shock

Next, a description will be given of the operation of the latch mechanism in this embodiment upon exertion of a shock from the exterior on the magnetic disk drive 10 in a retracted state of the AHSA 15 to the home position. It is presumed that, when a pivoting torque in B1 direction is applied to the AHSA 15 due to an external shock, a pivoting torque in B2 direction and a pivoting torque in B3 direction are simultaneously applied to the inertia member 100 and the latch member 150, respectively.

However, since the moment of inertia of the latch member 150 is smaller than that of the inertia member 100, the first abutting pin 157 of the latch member 150 comes into abutment against the first abutting portion 105 of the inertia member, and the latch member 150 receives a torque from the inertia member 100 and moves pivotally in A3 direction. The angle at which the latch member 150 is moved by the inertia member 100 pivotally up to the latching position from the home position is set small relative to the angle at which the AHSA 15 moves pivotally from the home position to the latching position.

Therefore, even if the coil support 50 receives a pivoting shock in B1 direction, the latch mechanism used in this embodiment can latch the AHSA 15 at the latching position. As to the behavior of the latch mechanism upon further pivoting in A1 direction of the AHSA 15 due to a latching reaction and re-collision with the outer crash stop 31, it is as described previously.

More specifically, even if the inertia member 100 and the latch member 150 return to the home position, if the collision energy of the AHSA 15 is large, the inertia member 100 receives a torque from the coil support 50 during elastic deformation of rubber, and by a cooperative operation of both inertia member 100 and latch member 150, the engaging portion 155 of the latch member 150 moves to the latching position and assumes a latchable state. If the collision energy is small, the AHSA 15 can stay in the retraction range.

Although an embodiment of the present invention has been described above with reference as an example to a load/unload type magnetic disk drive using a ramp, the present invention is also applicable to a CSS type magnetic disk drive in which a head/slider is retracted to a retraction area formed near an inner periphery of the magnetic disk 11. In this case, as is apparent to those skilled in the art, the device may be constructed such that the inner crash stop functions to absorb a shock, and while the inner crash stop is deformed elastically, the inertia member receives a torque from the coil support and causes the latch member to move pivotally up to the latching position.

Figure 8:
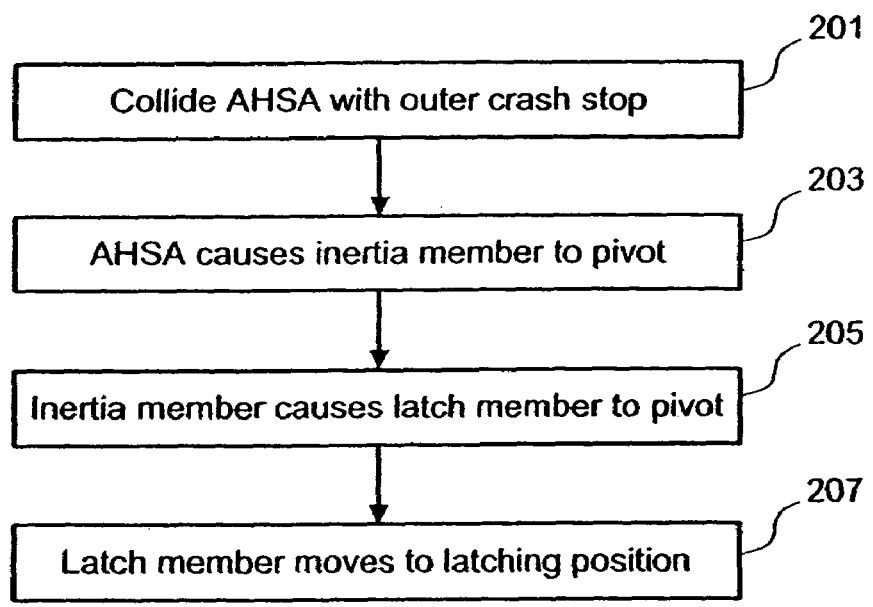
FIG. 8 is a flow chart showing a latching method according to the embodiment.

Next, with reference to FIG. 8, a description will be given about in what manner the latch mechanism in the rotating disk storage device adopted in this embodiment converts shock energy into rotational energy through an elastic member and a rebounding impact force is attenuated to effect latching. In block 201, the AHSA 15 is moved pivotally in A1 direction into collision with the outer crash stop 31. In block 203, the AHSA 15 is abutted against the inertia member 100 and is moved pivotally at least in a partial period in which the AHSA pivots in A1 direction while allowing the outer crash stop 31 to be deformed elastically.

In block 205, the inertia member 100 is abutted against the latch member 150 and is moved pivotally at least in a partial period in which the inertia member 100 is abutted against the AHSA and is moved pivotally. In block 207, the inertia member causes the engaging portion of the latch member to move up to the latching position. Therefore, even if the AHSA collides with the elastic member and rebounds, a part of shock energy is consumed as rotational energy of the inertia member and hence it is possible to diminish the shock in rebounding.

Figure 9:
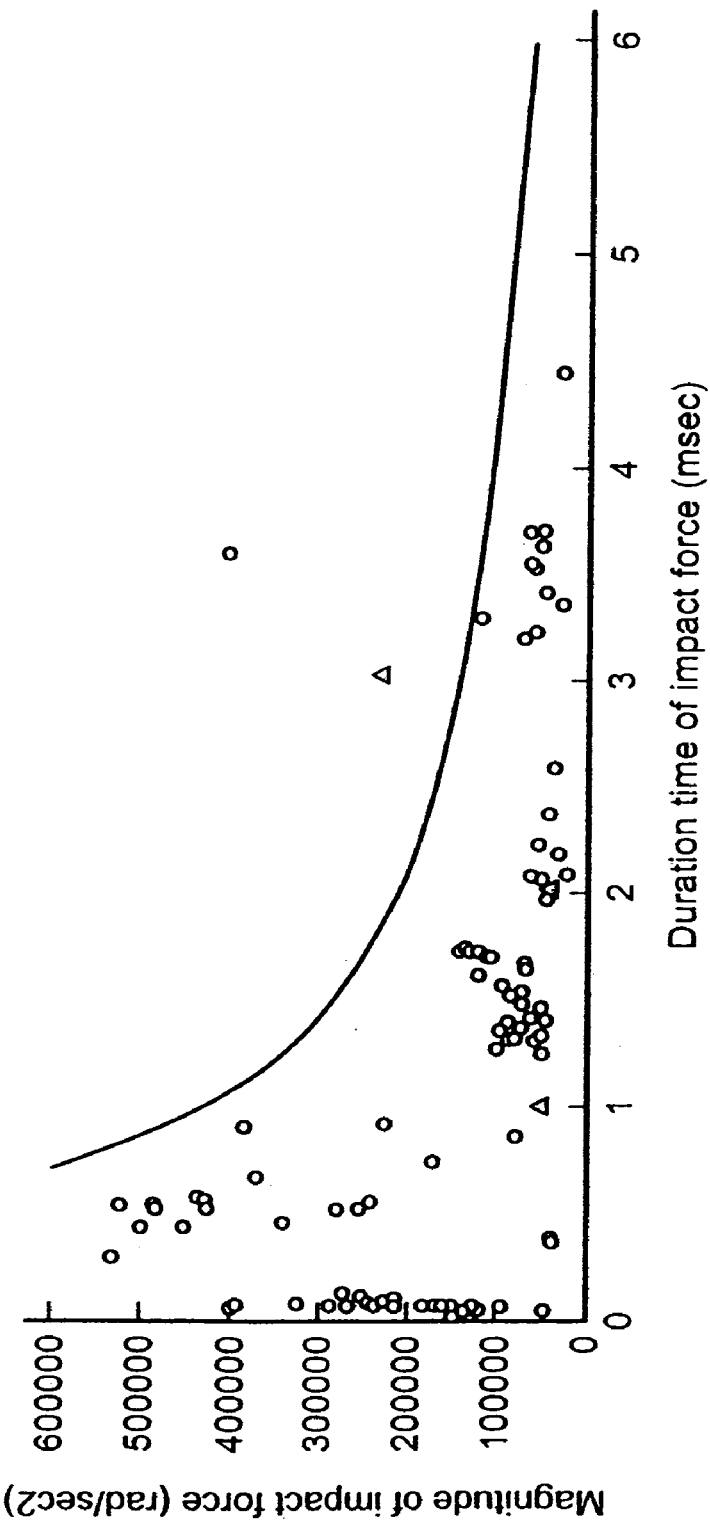
FIG. 9 illustrates the result of a shock test for the latch mechanism.

FIG. 9 shows the result of a latching test conducted for both first and second to-be-engaged portions 54, 55 under the application of an external shock to the magnetic disk drive with respect to the latch mechanism in this embodiment which has been described above with reference to FIGS. 3 to 7. The latching test was conducted using a rotational shock testing machine comprising a base portion and a rotating portion. The magnetic disk drive 10 was fixed to the rotating portion of the tester, an acceleration was given to the rotating portion by means of a cylinder to rotate the rotating portion about the pivot shaft of the magnetic disk, allowing it to collide with a stopper attached to the base portion, and an impact force in an instant of the collision was measured using an acceleration sensor attached to the stopper.

In FIG. 9, the axis of ordinate represents the magnitude of impact force, while the axis of abscissa represents a duration time of impact force. As a result of having repeated the shock test one hundred times, latching was effected in the to-be-engaged portion 54 ninety-seven times, while in the remaining three times latching was effected in the second to-be-latched portion 55. There was no example of the head/slider 13 jumping out to the recording surface of the magnetic disk 11. The mark Δ in FIG. 9 represents the result of latching effected in the second to-be-engaged portion. According to these results, the inertial latch mechanism used in this embodiment can prevent the failure in latching which occurs with a probability of about 3% in the absence of the second to-be-latched portion. Thus, it turned out that the occurrence of sticktion could be prevented more positively.

Figure 10:
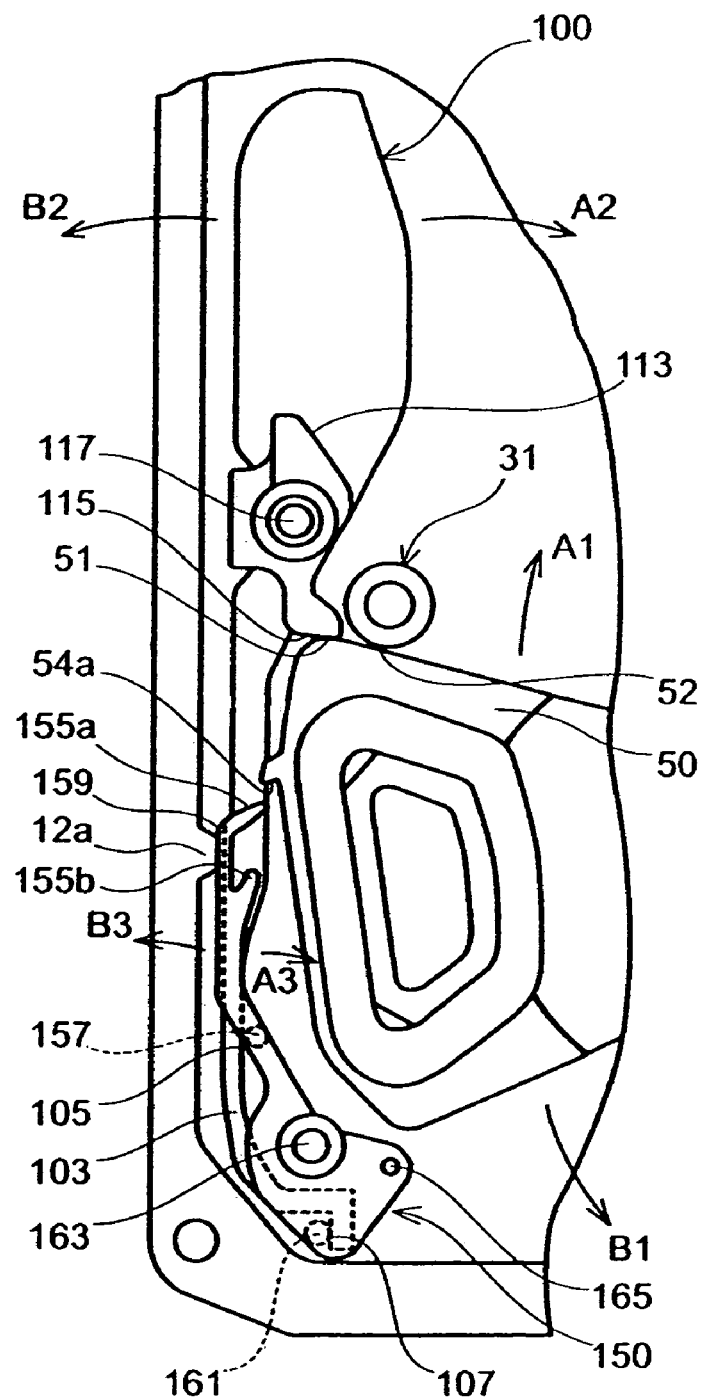
FIG. 10 illustrates another embodiment related to the structure of an engaging portion of a latch and a to-be-engaged portion.

FIG. 10 illustrates a latch mechanism in which one to-be-engaged portion 54*a* is provided in a pivotal outer periphery portion of the coil support 50 and both first engaging portion 155*a* and second engaging portion 155*b* are provided adjacent to the latch member 150. The first and second engaging portions 155a and 155b move simultaneously because both are formed in the latch member 150, but when viewed from the relation to the pivotal outer periphery portion of the coil support, the second engaging portion 155b is positioned in B1 direction relative to the first engaging portion 155a.

Usually, the first engaging portion 155a lathes the to-be-engaged portion 54a and causes the margin lip 19 to stop on the flat face 21b of the ramp 21. In the event the to-be-engaged portion 54a should pass the latching position and move pivotally in B1 direction before the first engaging portion 155a arrives at the latching position by some cause or other, the second engaging portion 155b comes into engagement with the to-be-engaged portion 54a and can cause the margin lip 19 to stop on the slant face 21a of the ramp 21.

Once the margin lip 19 stops on the slant face 21a, the head/slider 13 is apt to be influenced by a current of air from the magnetic disk 11 in a rotating state. Thus, the latching motion with the second engaging portion 155b is a preliminary motion, but it is possible to surely prevent the head/slider 13 from jumping out to the recording surface of the magnetic disk. Although in this embodiment the first and second engaging portions 155a and 155b adjacent to the latch member 150 are formed correspondingly to the pivoting direction of AHSA 15, the concept of the present invention includes the provision of three or more engaging portions.

Figure 11:
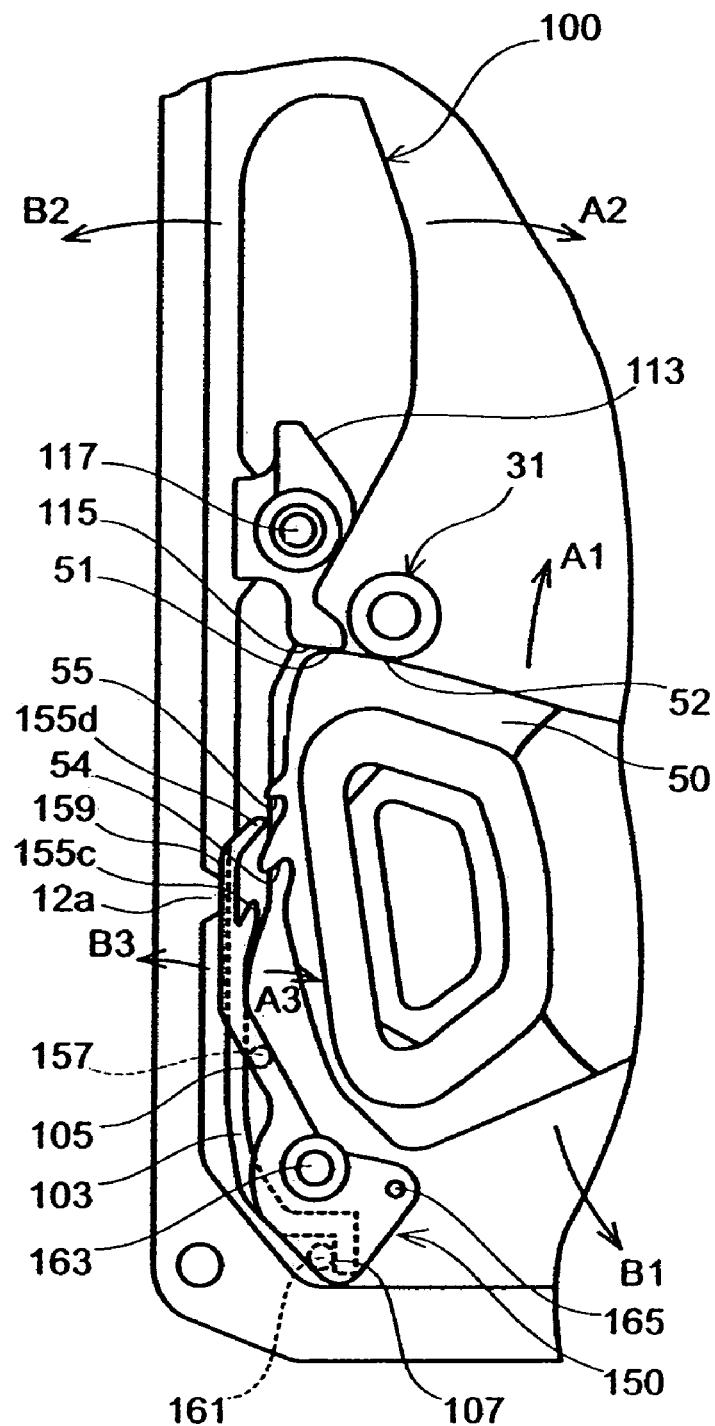
FIG. 11 illustrates a further embodiment related to the structure of an engaging portion of a latch and a to-be-engaged portion.

FIG. 11 illustrates a latch structure in which two engaging portions, i.e., a first engaging portion 155c and a second engaging portion 155d, are formed in the latch member in the embodiment illustrated in FIGS. 3 to 5. Usually, the first engaging portion 155c latches the first to-be-engaged portion 54 and at the same time the second engaging portion 155d latches the second to-be-engaged portion 55. At this time, the margin lip 19 stops on the flat face 21b of the ramp 21 at a position close to the slant face 21c. If the second to-be-engaged portion 55 should pass the latching position and move pivotally in B1 direction before the second engaging portion 155b arrives at the latching position by some cause or other, the first engaging portion 155c latches the second to-be-engaged portion 55, whereby the margin lip 19 can be stopped on the slant face 21a of the ramp 21. In this embodiment, the first and second engaging portions 155c, 155d are formed in adjacency to the latch member 150 and correspondingly to the pivoting direction of the AHSA 15. Further, the first and second to-be-engaged portions 54, 55 are formed in the pivotal outer periphery portion of the coil support 50. However, the concept of the present invention includes the provision of three or more with respect to each of such engaging portions and to-be-engaged portions.

Although the structure of engaging and to-be-engaged portions in the latch mechanism according to this embodiment have been described above, it will be apparent to those skilled in the art that the structure of engaging and to-be-engaged portions in the present invention is applicable not only to the inertial latch mechanism described above with reference to FIGS. 3 to 7 but also to a wide range of inertial latch mechanisms each comprising an inertia member and a latch member. As a typical inertial latch mechanism in a magnetic disk drive comprising an inertia member and a latch member, the following inertia latch is disclosed as a background art in FIG. 13 of WO 00/74056.

The inertia latch illustrated in FIG. 13 of WO 00/74056 comprises a lever which corresponds to the inertia member and a latch which corresponds to the latch member. An actuator arm which corresponds to the AHSA is provided with a coil support, and an end portion of the coil support corresponds to a to-be-engaged portion. The lever and the latch are each formed in the shape of an arm and are supported pivotably. When a shock acting to rotate the actuator arm in one direction is given to the device, the latch operates to latch the end portion of the coil support. When a shock acting to rotate the actuator arm in an opposite direction is given to the device, the lever with a large moment of inertia operates to apply a force to the latch and rotate the latch in a direction opposite to the shock-rotating direction of the latch, whereby the latch can latch the end portion of the coil support.

In such a typical inertia latch, the latch member is provided with an engaging portion, while the AHSA is provided with a to-be-engaged portion. When a shock is given to the device from the exterior, it is necessary for the engaging portion of the latch member to reach the latching position before the AHSA rotates and its to-be-engaged portion passes the latching position. The inertia latch operates against a shock having various parameters, so there can be a case where the engaging portion arrives at the latching position after the to-be-engaged portion passes the latching position. Therefore, a latch mechanism having plural to-be-engaged portions which arrive at the latching position later in terms of time are effective for inertia latches at large.

Although the present invention has been described above on the basis of specific embodiments illustrated in the drawings, it will be easy for those skilled in the art to understand that the invention is not limited to those specific embodiments, but that any known changes may be added to the embodiments and other embodiments are adoptable. For example, it will be apparent that to-be-engaged portions are not provided in such a pivotal outer periphery portion of the coil support as illustrated in the drawings, but may be provided in an upper or lower surface of the coil support, around the pivot shaft bearing portion, or ahead of the pivot shaft bearing portion, e.g., in the actuator arm.

The present invention is applicable to rotating disk storage devices at large, particularly to those used in an environment in which they are apt to undergo a shock.

What is claimed is:

1. A rotating disk storage device comprising:
   a rotating disk storage medium;
   an actuator head suspension assembly with a head/slider mounted thereon and having a plurality of adjacent to-be-engaged portions, said actuator head suspension assembly being pivotable in both first and second directions;
   a member configured to restrict a pivoting range of said actuator head suspension assembly in the first direction;
   an inertia member configured to operate upon exertion of a shock on said rotating disk storage device; and
   a latch member having a single engaging portion configured to latch either of said plural to-be-engaged portions in a retraction area to restrict a pivotal movement of said actuator head suspension assembly in the second direction, said latch member being configured to operate upon receipt of force from the moving inertia member and cause said engaging portion to move up to a latching position,
   wherein each of the plural to-be-engaged portions open at an angle in the pivoting direction of said actuator head suspension assembly;
   wherein said actuator head suspension assembly is able to pivotally move in the first direction even while engaged with the latch member.

2. A rotating disk storage device according to claim 1, wherein said inertia member is configured to operate in abutment against said actuator head suspension assembly which moves pivotally in the first direction and restrict the pivoting range in the first direction.

3. A rotating disk storage device according to claim 1, wherein the member configured to restrict the pivoting range in the first direction is an elastic member supported by a base of said rotating disk storage device.

4. rotating disk storage device according to claim 1, wherein said actuator head suspension assembly has a coil support, and said plural to-be-engaged portions are provided in said coil support.

5. A rotating disk storage device according to claim 1, wherein said plural to-be-engaged portions are adjacent to a pivotal outer periphery portion of said actuator head suspension assembly.

6. A rotating disk storage device according to claim 5, wherein said plural to-be-engaged portions comprise a first to-be-engaged portion and a second to-be-engaged portion, and said latch member has a first engaging portion and a second engaging portion, said first and second engaging portions being engageable with said first and second to-be-engaged portions, respectively, said first engaging portion being further engageable with said second to-be-engaged portion.

7. A rotating disk storage device according to claim 1, further comprising a ramp configured to provide said actuator head suspension assembly with a retraction area, said ramp including, in the first direction, a first slant face, a first flat face adjacent to said first slant face, a second slant face adjacent to said first flat face, and a second flat face which provides a home position and which is adjacent to said second slant face, and said actuator head suspension assembly includes a margin lip configured to engage with said ramp, said margin lip being configured to stop on said first flat face when any of said plural to-be-engaged portions is latched with the engaging portion of said latch member.

8. A rotating disk storage device according to claim 7, wherein said margin lip stops on said first slant face when any of the other to-be-engaged portion(s) is latched with the engaging portion of said latch member.

9. A rotating disk storage device according to claim 1, further comprising a ramp configured to provide said actuator head suspension assembly with a retraction area, said ramp including, in the first direction, a first slant face, a first flat face adjacent to said first slant face, a second slant face adjacent to said first flat face, and a second flat face which provides a home position and which is adjacent to said second slat face, and said actuator head suspension assembly includes a margin lip configured to engage with said ramp, said margin lip being configured to stop on said second slant face when any of said plural to-be-engaged portions is latched with the engaging portion of said latch member.

10. A rotating disk storage device according to claim 1, adopting a contact start/stop system wherein a retraction area is provided on a surface of said rotating disk storage medium.

11. A rotating disk storage device comprising:
a rotating disk storage medium;
an actuator head suspension assembly with a head/slider mounted thereon and having a plurality of adjacent to-be-engaged portions, said actuator head suspension assembly being pivotable in both first and second directions;
a member configured to restrict a pivoting range of said actuator head suspension assembly in the first direction;
an inertia member configured to move upon receipt of force from said actuator head suspension assembly; and
a latch member having a single engaging portion configured to latch either of said plural to-be-engaged portions in a retraction area to restrict a pivotal movement of said actuator head suspension assembly in the second direction, said latch member being configured to move upon receipt of force from said inertia member and cause said engaging portion to move up to a latching position, wherein each of the plural to-be-engaged portions open at an angle in the pivoting direction of said actuator head suspension assembly;
wherein said actuator head suspension assembly is able to pivotally move in the first direction even while engaged with the latch member.

12. A rotating disk storage device according to claim 11, wherein said actuator head suspension assembly has a coil support, and said plural to-be-engaged portions are provided in said coil support.

13. A rotating disk storage device according to claim 11, wherein said plural to-be-engaged portions are adjacent to a pivotal outer periphery portion of said actuator head suspension assembly.

14. A rotating disk storage device according to claim 13, wherein said plural to-be-engaged portions comprise a first to-be-engaged portion and a second to-be-engaged portion, and said latch member has a first engaging portion and a second engaging portion, said first and second engaging portions being engageable with said first and second to-be-engaged portions, respectively, said first engaging portion being further engageable with said second to-be-engaged portion.

15. A rotating disk storage device according to claim 11, further comprising a ramp configured to provide said actuator head suspension assembly with a retraction area, said ramp including, in the first direction, a first slant face, a first flat face adjacent to said first slant face, a second slant face adjacent to said first flat face, and a second flat face which provides a home position and which is adjacent to said second slant face, and said actuator head suspension assembly includes a margin lip configured to engage with said ramp, said margin lip being configured to stop on said first flat face when any of said plural to-be-engaged portions is latched with the engaging portion of said latch member.

16. A rotating disk storage device according to claim 15, wherein said margin lip stops on said first slant face when any of the other to-be-engaged portion(s) is latched with the engaging portion of said latch member.

17. A rotating disk storage device according to claim 11, further comprising a ramp configured to provide said actuator head suspension assembly with a retraction area, said ramp including in the first direction, a first slant face, a first flat face adjacent to said first slant face, a second slant face adjacent to said first flat face, and a second flat face which provides a home position and which is adjacent to said second slant face, and said actuator head suspension assembly includes a margin lip configured to engage with said ramp, said margin lip being configured to stop on said second slant face when any of said plural to-be-engaged portions is latched with the engaging portion of said latch member.

18. A rotating disk storage device according to claim 11, adopting a contact staff/stop system wherein a retraction area is provided on a surface of said rotating disk storage medium.

19. A rotating disk storage device comprising:
a rotating disk storage medium;
an actuator head suspension assembly with a head/slider mounted thereon and having a to-be-engaged portion, said actuator head suspension assembly being pivotable in both first and second direction;
a member configured to restrict a pivoting range of said actuator head suspension assembly in the first direction;
an inertia member configured to operate upon exertion of a shock on said rotating disk storage device;
a latch member having adjacent first and second engaging portions to latch said to-be-engaged portion to restrict a pivotal movement of said actuator head suspension assembly in the second direction, said latch member being configured to operate upon receipt of force from said inertia member, said latch member being able to latch said to-be-engaged portion through either said first or said second engaging portion;

wherein said actuator head suspension assembly is able to pivotally move in the first direction even while engaged with the latch member.

20. A rotating disk storage device according to claim 19, wherein said inertia member is configured to operate upon receipt of force from said actuator head suspension assembly.

* * * * *

UNITED STATES PATENT AND TRADEMARK OFFICE
CERTIFICATE OF CORRECTION

| | | |
|---|---|---|
| PATENT NO. | : 7,460,339 B2 | Page 1 of 1 |
| APPLICATION NO. | : 10/892944 | |
| DATED | : December 2, 2008 | |
| INVENTOR(S) | : Kawakami et al. | |

It is certified that error appears in the above-identified patent and that said Letters Patent is hereby corrected as shown below:

In the Claims:

Claim 18, column 20, line 50, please delete "staff/stop" and insert --start/stop--.

Signed and Sealed this

Twenty-fourth Day of February, 2009

JOHN DOLL
*Acting Director of the United States Patent and Trademark Office*